United States Patent [19]

Melo et al.

[11] Patent Number: 5,138,706
[45] Date of Patent: Aug. 11, 1992

[54] PASSWORD PROTECTED ENHANCEMENT CONFIGURATION REGISTER FOR ADDRESSING AN INCREASED NUMBER OF ADAPTER CIRCUIT BOARDS WITH TARGET MACHINE EMULATION CAPABILITIES

[75] Inventors: Maria L. Melo, Houston; Karl N. Walker, Hockley, both of Tex.

[73] Assignee: Compaq Computer Corporation, Houston, Tex.

[21] Appl. No.: 312,903

[22] Filed: Feb. 21, 1989

[51] Int. Cl.5 ............................................. G06F 9/455
[52] U.S. Cl. ............................. 395/500; 364/916;
364/933; 364/933.2; 364/975.2; 364/DIG. 2; 395/800
[58] Field of Search ... 364/200 MS File, 900 MS File; 395/800, 500

[56] References Cited

U.S. PATENT DOCUMENTS

| | | | |
|---|---|---|---|
| 4,177,452 | 12/1979 | Balasubramanian et al. | 340/166 |
| 4,218,740 | 8/1980 | Bennett et al. | 364/200 |
| 4,453,211 | 6/1984 | Askinazi et al. | 364/200 |
| 4,453,229 | 6/1984 | Schaire | 364/900 |
| 4,661,991 | 4/1987 | Logemann | 455/26.1 |
| 4,791,602 | 12/1988 | Resnick | 364/900 |
| 4,815,031 | 3/1989 | Furukawa | 364/900 |
| 4,859,995 | 8/1989 | Hansen et al. | 340/710 |
| 4,885,482 | 12/1989 | Sharp et al. | 364/200 |
| 4,970,504 | 11/1990 | Chen | 340/825.31 |
| 4,984,213 | 6/1991 | Abdoo et al. | 365/230.3 |
| 4,991,085 | 2/1991 | Pleva et al. | 364/200 |

OTHER PUBLICATIONS

IBM Corp., Personal System/2 Model 80 Technical Reference, First Edition, Apr. 1987, pp. 2-29 to 2-51.
"Eisa vs. Microchannel: Multimastering is the Key", Electronic Design, vol. 36, No. 23, 13 Oct. 1988, pp. 38-40.

Primary Examiner—Thomas C. Lee
Assistant Examiner—William M. Treat
Attorney, Agent, or Firm—Pravel, Gambrell, Hewitt, Kimball & Krieger

[57] ABSTRACT

A computer system is provided which is compatible with existing programmable option select systems and which provides optional enhanced system setup capabilities. The enhanced system permits use of application software designed specifically for existing programmable option select systems which utilize limited system configuration data registers but further provides an optional mode accessed during system setup procedures wherein application software can access and utilize an expanded set of system setup configuration registers to enhance the performance of the computer system.

17 Claims, 5 Drawing Sheets

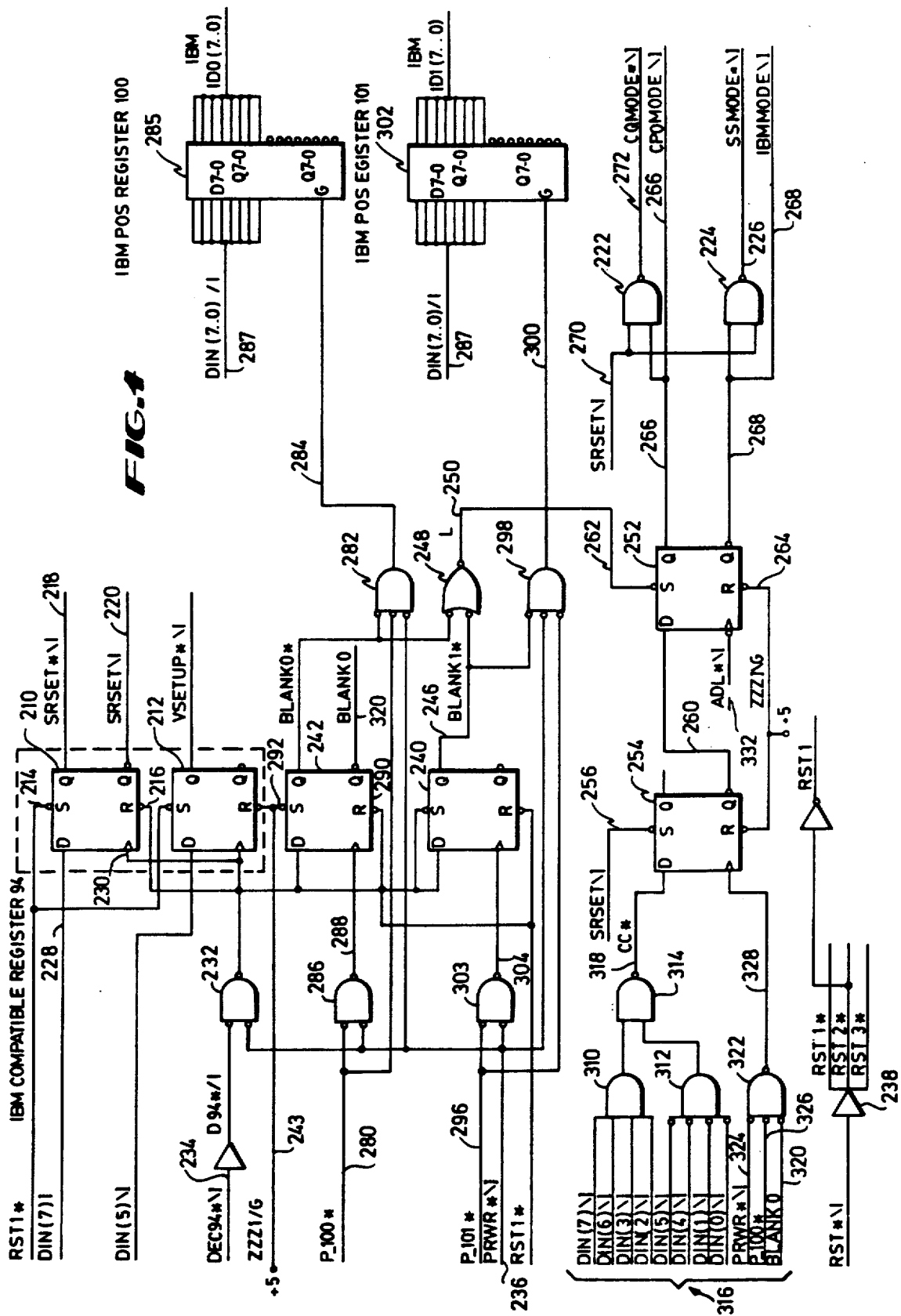

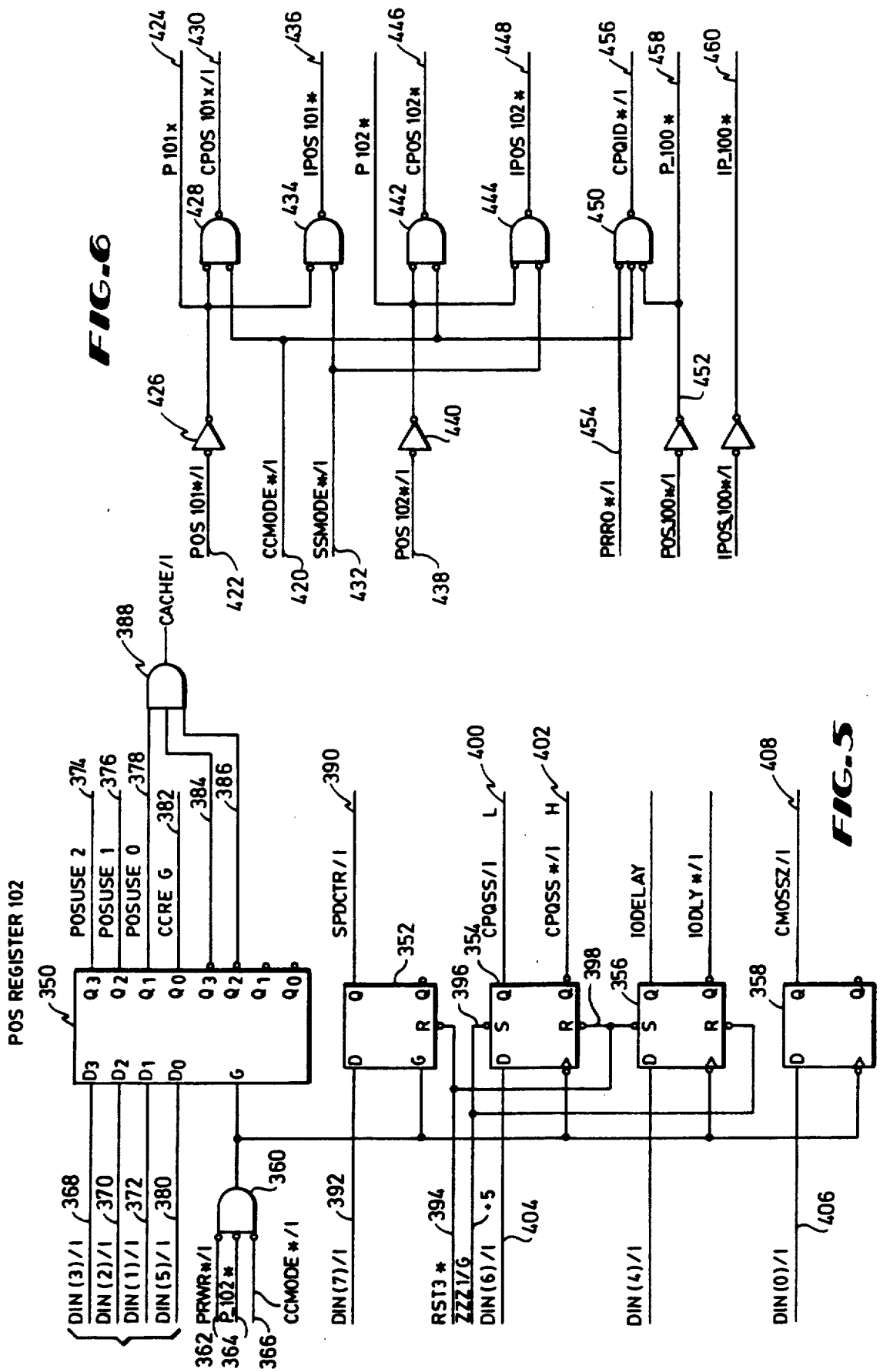

PASSWORD PROTECTED ENHANCEMENT CONFIGURATION REGISTER FOR ADDRESSING AN INCREASED NUMBER OF ADAPTER CIRCUIT BOARDS WITH TARGET MACHINE EMULATION CAPABILITIES

BACKGROUND OF THE INVENTION

1. Field of the Invention

The present invention relates to personal computer systems, more particularly to computer systems utilizing programmable option select system configuration, wherein upon power up or reset the system automatically executes an initialization sequence to establish the configuration of peripheral devices or expansion circuit boards which are user specified.

2. Description of the Prior Art

Personal computers have evolved since the introduction of early models based upon the Intel 8088 microprocessor. This microprocessor formed the basis for the International Business Machine Corporation PC as well as other IBM compatible machines. As the popularity of personal computers rose, so did the demand for more advanced features, system capacity and speed. This ever-increasing demand led to the development of higher order microprocessors such as the Intel 80286 and 80386.

These later integrated circuit microprocessors formed the basis for the IBM XT and AT model personal computers as well as other IBM compatible machines such as the COMPAQ Desk Pro models. With the introduction of higher order microprocessors came demand for increased system expansion capability, more efficient data handling, communications and memory addressing. In response to these demands the personal computing industry has grown to include numerous system expansion modules or peripheral devices such as modems, printers, hard and floppy disk drives, memory expansion boards, networking expansion boards and the like. All of these demands led to the development of more efficient and capable system architectures such as the Extended Industry Standard Architecture utilized by COMPAQ and others, and the Micro Channel Architecture (MCA) used by IBM.

One of the features provided by the MCA was the ability to initialize circuit board parameters entirely by program control, without the need to set any jumpers or switches. This feature was called Programmable Option Select (POS) and utilized certain defined input/output (I/O) space locations or ports to control which circuit boards or adapters were being configured and where configuration information was to be located. A circuit board was configured by first selecting which circuit board location was to be addressed and placing the circuit board in setup or configuration mode. The configuration information was then loaded and setup mode exited.

Because of the large market share of the IBM compatible machines, it is highly desirable that personal computing systems and application software maintain compatibility with the MCA Personal Systems computers. Nevertheless, in the time that such systems have been available, it has become apparent that the MCA systems have inherent limitations which prevent full utilization of the capabilities of the INTEL 80386 microprocessor. One such inherent limitation is imposed by the design of the MCA system which limits the addressability of static memory used to store system configuration data through the Programmable Option Select feature to a relatively small 2048 bytes or 2K allocation. Another inherent MCA system limitation restricts the number of programmable expansion slots for any MCA system to eight. The present invention alleviates these inherent limitations, among others, while maintaining full compatibility with MCA software to more fully utilize the capabilities of the 80386 microprocessor.

In MCA systems, the programmable option select feature eliminates switches from system boards and adapters for identification and configuration purposes. Instead of switches, these functions are performed by a set of programmable registers or latches located on the system board and the adapter boards. In an MCA system, an adapter description file, or ADF, is maintained for each adapter in system CMOS or static memory. At power up, the system initialization sequence causes the POS registers on the system board and adapters to be read and compared for matching data in the ADF. Thereafter, if the system identification configuration data has changed, an initialization sequence is executed and the system is reconfigured. The new system configuration data is then stored in CMOS static memory with the adapter identification numbers.

In MCA systems, adapters and system board set up functions share input/output addresses 0100h through 0107h. Unless otherwise noted, all references in the present application to addresses will be hexadecimal format, and the "h" designation will be omitted. These addresses are accessed through programmable option select control port 0094 for the system board and 0096 for the adapters. In other words system board and adapter set up functions respond to instructions in addresses 0100-0107 only when special device setup signals in IO ports 0094 and 0096 are active. After setup, I/O addresses or ports 0094 and 0096 are set to the values FF and 00, respectively, and system configuration POS registers cannot be accessed unless the machine is in setup mode. The following chart shows the organization of the input/output address space used by IBM MCA systems for the programmable option select feature:

| Address (h) | Function |
|---|---|
| 0094 | System Board Enable/Setup Register |
| 0095 | Reserved |
| 0096 | Adapter Enable/Setup Register |
| 0097 | Reserved |
| 0100 | POS Register 0 - Adapter Identification Byte (LSB) |
| 0101 | POS Register 1 - Adapter Identification Byte (MSB) |
| 0102 | POS Register 2 - Option Select Data Byte 1 Bit 0 designated Card Enable |
| 0103 | POS Register 3 - Option Select Data Byte 2 |
| 0104 | POS Register 4 - Option Select Data Byte 3 |
| 0105 | POS Register 5 - Option Select Data Byte 4, Bit 7 Designated as "Check", Bit 6 Reserved |
| 0106 | POS Register 6 - Subaddress Extension (Least Significant Byte) |
| 0107 | POS Register 7 - Subaddress Extension (Most Significant Byte) |

Bits 6 and 7 of address 0105 and bit 0 of address 102 are fixed, all others in the field 0102 through 0105 are free form.

In IBM MCA systems, i.e., the Personal System Model 80, upon power up, the system executes a programmable option select power on self test sequence, wherein configuration of the system board and adapters is verified. The system board configuration is verified by providing the appropriate set up enabling (low) signals via POS register 094 bits 7, 5 for the system board and graphics subsystem (VGA). With respect to the system board, POS registers 100, 101 are read only and in IBM systems are hardwired with register 100 fixed at hex value FF and 101 fixed to a given system configuration identification value which identifies the model and specific features of the system in question.

Set up of the diskette drive controller and serial and parallel interfaces are controlled through POS register 102. System memory, consisting of one or two 1 megabyte RAM units, is set up via POS register 103 whereby memory division, refresh rate and capacity are defined.

Setup or configuration of adapters used in MCA systems is implemented in essentially the same fashion as the system board, with the exception that each adapter responds to setup only when a unique card setup signal is active. A unique card setup signal is provided by decoding bits 0, 1, 2 and 3 of the 8 bit I/O port address 096. In the IBM MCA system, bit 7 of byte 096 is utilized for channel reset, bits 4, 5 and 6 are set equal to one when read and bit 3 is decoded to discriminate between a system setup enable (low) and an adapter setup enable (high). This design imposes a limitation on the number of uniquely identifiable adapters to eight, the number which can be uniquely identified via bits 0, 1 and 2 of byte 096. The system of the present invention maintains compatibility with this scheme and permits expansion of the number of uniquely indentifiable adapters in the manner described herein.

Furthermore, as implemented by IBM, MCA POS machines utilize a battery-backed CMOS RAM for system configuration data accessible by the POS sequences which is physically limited to 2048 bytes or 2K bytes. Such a physical limitation is undesirable, particularly where, as in the system of the present invention, the number of addressable adapter slots is increased and other enhanced features accessible through a POS sequence are provided. The system of the present invention therefore provides a means for enhancing the POS addressable memory when in enhanced operation and of restricting access to such enhanced memory when full IBM emulation is required.

Further information concerning the IBM Personal System/2, the MCA architecture and POS feature can be found in the IBM Personal System/2 Model 80 Technical Reference Manual, having a copyright date of 1987 and a product number of 84×1508.

SUMMARY OF THE INVENTION

Briefly stated, the present invention provides an entirely compatible MCA POS system having means for emulating a designated IBM MCA machine, wherein a first set of POS registers fully duplicate IBM MCA POS organization and function and wherein a second set of POS registers, complementary to the first set are provided to expand the capability of the system. The enhanced features include, for example, the ability to uniquely address more than eight adapters and to provide enhanced addressability to POS CMOS memory. In addition to this additional circuitry, a unique circuit is provided whereby upon power up the initialization sequence executed determines the standard IBM MCA system to emulate in IBM mode, and permits access to the enhanced system according to the present invention in enhanced mode. In IBM mode, access to the enhanced features is restricted, thereby maintaining full compatibility with applications software designed for standard IBM MCA systems.

BRIEF DESCRIPTION OF THE DRAWINGS

A better understanding of the invention can be obtained when the following detailed description of the preferred embodiment is considered in conjunction with the following drawings, wherein:

FIGS. 3, 4, 5, and 6 are schematic diagrams of various circuit which form a part of the system of the present invention.

BRIEF DESCRIPTION OF THE PREFERRED EMBODIMENT

Figure 1:
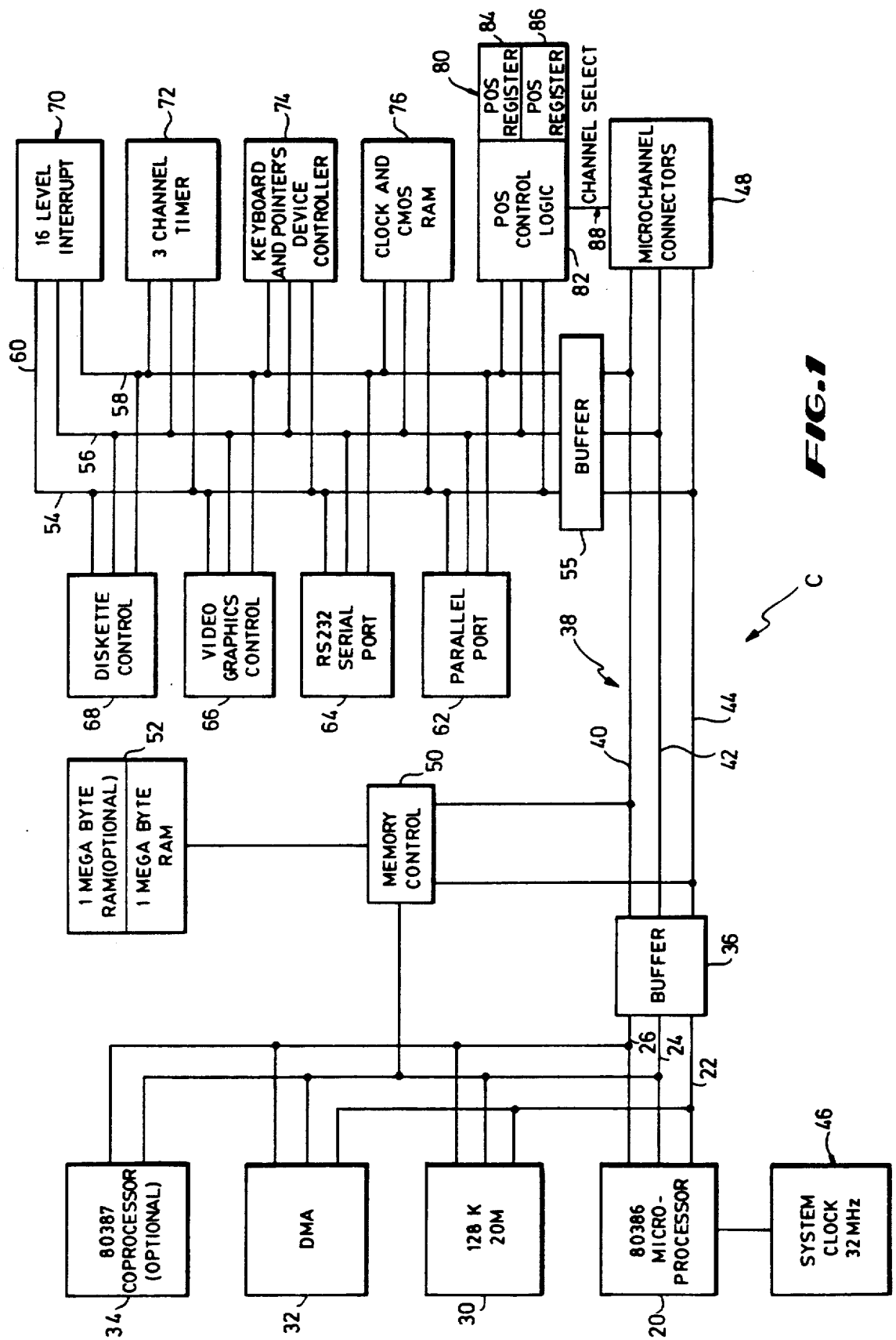
FIG. 1 is a block diagram of a computer system incorporating the present invention.

Referring now to FIG. 1, the letter C refers generally to an MCA POS computer system incorporating the present invention. The computer system C includes a microprocessor 20, which is preferably an Intel 80386 microprocessor. Connected to microprocessor 20 via processor address bus 22, processor control bus 24 and processor data bus 26 are a read only memory (ROM) unit 30, direct memory access unit 32, and an optional co-processor unit 34. These attached devices are utilized by microprocessor 20 to perform various functions in the conventional manner well known in the art.

A buffer 36 separates the processor buses and a system bus 38. Bus 38 includes system data, control and address lines 40, 42 and 44, respectively. A 32 MHZ system clock 46 is provided and attached directly to processor 20. System bus 38 connects to microchannel terminal 48 which includes microchannel bus connectors for receiving adapter card terminals such as are provided on external circuit boards or peripheral devices which have access to the MCA system bus. In IBM MCA machines connector 48 only provides for eight adapters because of the system's inherent limitation discussed above. In the system of the present invention, connector 48 includes as many connectors as the particular embodiment is designed to uniquely address.

Also connected to system bus 38 and processor control bus 24 is memory control logic circuit 50, which is utilized by processor 20 to control access to system random access memory 52.

Peripheral devices are connected to system C via a peripheral bus 54, which includes control, data and address buses 56, 58 and 60. Peripheral bus 54 is connected to system bus 38 via buffer 55. Peripherals shown in FIG. 1 are typical of those utilized in an MCA POS system, and include parallel port 62, serial port 64, video graphics adapter 66, diskette control 68, interrupt control 70, three channel timer 72, keyboard and pointing device controller 74 and battery-backed clock and CMOS RAM 76 all functioning in the conventional manner.

In addition to these conventional peripherals, the system of the present invention includes a programmable option select unit 80, which includes a control logic circuit 82 and two sets of programmable option select registers 84 and 86. Control logic circuit 82 is a logic circuit which controls access to POS registers 84 and 86, and in the manner described in detail below enables the system to operate in an IBM emulation mode or an enhanced or COMPAQ mode based upon whether the particular software application program includes instructions designed to place the system C in enhanced mode. Placing the machine in enhanced mode permits the system to uniquely address and initialize more than eight adapters and to access more than the IBM standard 2K byte CMOS RAM for programmable option select configuration data. As will be appreciated by those of skill in the art, the system of the present invention also permits other enhancements of the system C not permitted in the standard IBM MCA mode. A channel select bus 88 connects POS unit 80 to microchannel connector 48 so that individual adapters connected to connector 48 can be addressed or selected for read/write operations over bus 38 during setup and configuration operations. Bus 88 includes one channel select line for each adapter that the system is configured to individually address.

Figure 2:
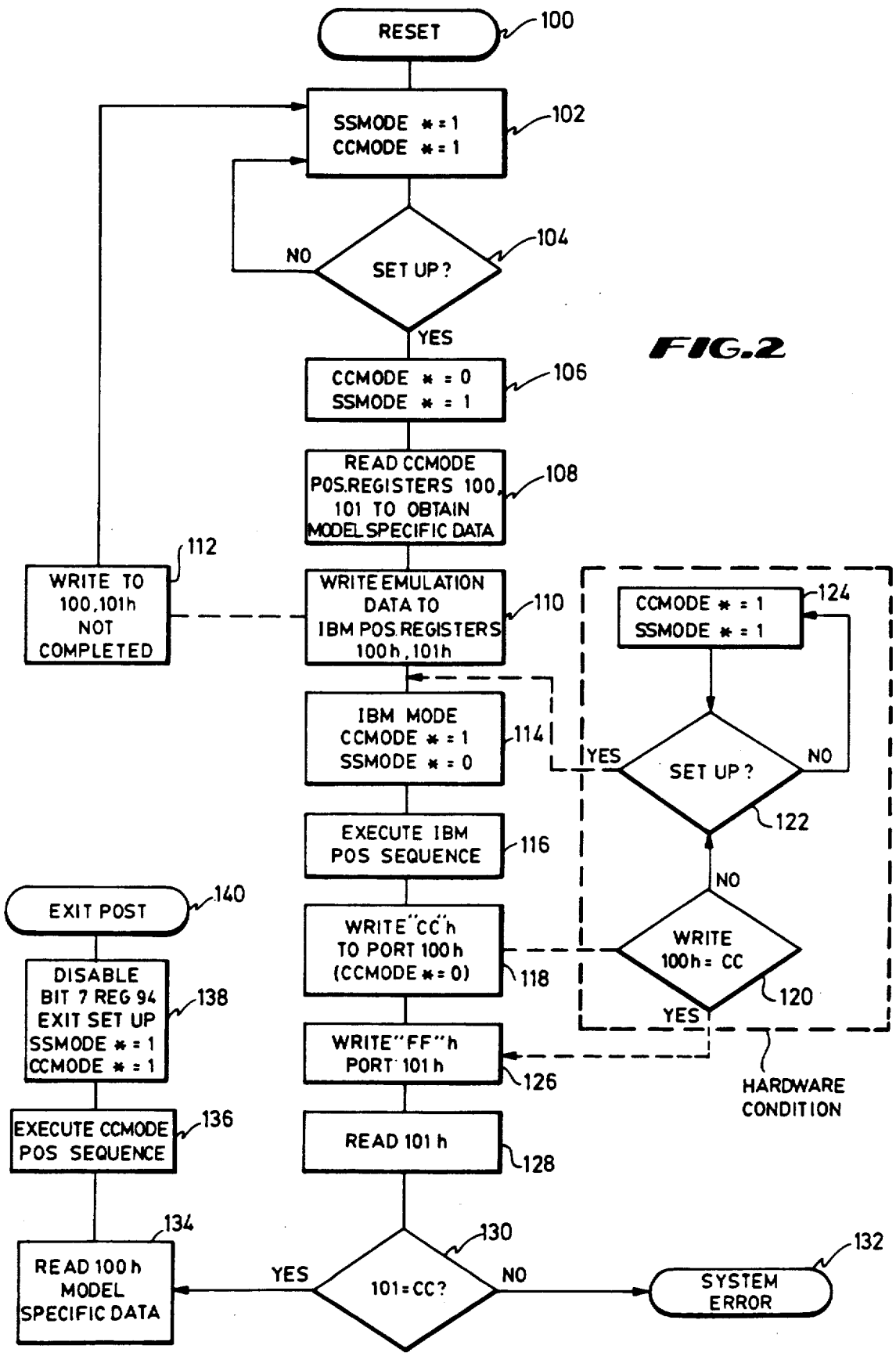
FIG. 2 is a schematic flow chart diagram descriptive of a sequence of system identification logic executed by the computer system of the present invention.

Referring now to FIG. 2, a flow chart is provided which illustrates schematically the control logic embodied in logic circuit 82. On power up or reset this circuit controls the initialization of the system board POS registers based upon instructions in system read only memory which are automatically executed. This circuit also controls a mode latch which is set to select the system mode as either IBM emulation or enhanced mode. This logic circuit only permits a mode change when in system setup and cannot be accessed during execution of a program.

IBM standard system board POS sequences are typically as follows:

1) place the system board into set up mode;
2) write FF to I/O port 100;
3) read 100 to obtain the least significant byte of the system board identification data;
4) write FF to I/O port 101; and
5) read 101 to get the most significant byte of the system board identification data.

It is a feature of the present invention that utilizing this typical IBM standard POS sequence on the system of the present invention will produce a response consistent with standard IBM MCA POS systems.

System board POS register 84 (FIG. 1) is initialized to fully emulate a particular IBM MCA system. Thus POS register 84 includes readable, writable data registers which respond to input/output addresses 0100–0107 when the system board setput enable signal is active via I/O address port bit 0094. Once initialized, these registers function in the same fashion as standard IBM MCA systems. In IBM standard MCA systems, registers 0100 and 0101 are hardwired to the system ID and configuration data. To provide the enhanced capabilities of the present invention, these hardwired registers are replaced with readable, writable registers which must be initialized to correspond to the target identification data of the IBM system to be emulated.

In FIG. 2, the system configuration POS logic is schematically illustrated in flow chart form. In the preferred embodiment this logic is implemented through a combination of hardware and system initialization sequences stored in system ROM and automatically executed on power-up or reset. On reset, processor 20 accesses system configuration or initialization instructions stored in system ROM and battery backed CMOS. Circuit 82 functions to carry out the system configuration sequence, whereupon the logical steps set forth in FIG. 2 are executed as part of system configuration before other operations are permitted.

Referring now to FIG. 2, system initialization begins on reset at step 100. When the reset signal is enabled, variables CCMODE*, and system setup mode or SSMODE* are initialized to logic high level or the value one at step 102. Thereafter, at step 104, if the system board is in system board set up mode, i.e., if bit 7 of byte 094 is low, bit 3 of byte 096 is low and bit 5 of byte 094 is high, step 106 causes variable CCMODE* to be set to the enhanced or COMPAQ mode of operation. Ordinarily a system initialization instruction will on reset put the system in setup mode by enabling the appropriate bits of POS register 094. If at step 104 it is determined that the register is not in system board setup mode, a logic loop is executed back to step 102.

Once CCMODE* is active or low at step 106, step 108, a ROM instruction, causes registers 100, 101 (enhanced or COMPAQ mode) to be read without first writing to them. These registers, in contrast to prior art IBM systems, can be read without writing to them first to charge the bus. Reading CCMODE* registers 100, 101 returns the machine data, i.e. the identification data of the specific model of enhanced system in use. This data is stored in the system CMOS. Thereafter, step 110, based upon the model specific data obtained in step 108, a ROM instruction, causes the appropriate target machine identification data to be written to POS registers 100, 101. This step initializes the IBM POS emulation registers to emulate the response of an IBM standard MCA system, which is required since in the present invention POS registers 100, 101 are not hardwired as in standard IBM systems. A write command to POS registers 100, 101 latches this data in the IBM POS registers 100, 101 since the CCMODE registers are read only. If, due to system error, POS registers 100, 101 are not initialized at step 110, the system setup control sequence is exited to an idling state awaiting completion of the initialization as described above. This step is schematically illustrated at step 112 in FIG. 2. In this way POS registers 100, 101 are initialized to emulate the target IBM MCA machine before system operations can continue.

Once this initialization of system board POS registers is complete, control is transferred to step 114 which is the beginning of the typical setup procedure. Steps 100 through 112 occur only after reset, and not when the system is placed in setup mode at any other time. IBM POS registers 100, 101 are configured so as to be only writable one time after power on or reset and cannot be written to in subsequent setup routines.

At step 114, the system is set into IBM setup mode with bit 7 of register 94 set equal to zero and the remaining bits are set equal to one, i.e., register 094 is set to 7F, and variable SSMODE* set active or low. Note that it is possible that the system may already be in setup mode due to previous setup sequences. Therefore, on setup operations other than after reset, the procedure functionally begins in IBM emulation mode, restricting access to the enhanced features unless the enhanced mode signal is also active.

The requirement that access to enhanced features is limited to those instances where the enhanced mode signal is active is schematically illustrated in FIG. 2 in steps 114 through 140. If the system is in setup mode, but a write command to POS address 0100 and a data value of CC is not present, a hardware implemented condition is not satisfied and the system immediately reverts to IBM mode. This hardware implemented condition is schematically illustrated in steps 120, 122 and 124, but it should be understood that this condition is not imposed by a software instruction. If a write CC to POS register 100 is present, steps 118, 120 and 126 and subsequent steps permit access to the enhanced features. Variable CCMODE* is active or low only as long as the value CC is being written to POS register 100 and the system is still in system board setup mode. For the purposes of simplicity, the portion of the setup sequence shown in FIG. 2 after step 118 presumes that the CCMODE* enabling signal has not been disabled by a write command to POS register 100 at a value other than CC. It should be understood that if such event occurs, CCMODE* is automatically disabled and the sequence defaults to step 120.

In operation of programs written exclusively for IBM equipment will not access the enhanced mode features because in standard IBM MCA machines POS register 100 is hardwired and not writable. Thus, this feature permits the software engineer to access the enhanced features on systems of the present invention by utilizing this instruction as a password. On the other hand, the system of the present invention will fully emulate the POS responses of standard IBM MCA systems setup procedure in steps 114, 116, 120 and 122 if the write CC to POS register 100 does not occur.

If at step 118 and thereafter a write CC to POS register 100 is active, at step 126 a write FF to port 101 occurs causing FF to be written to CCMODE POS register 101. This register is then read at step 128. On a machine of the present invention, reading CCMODE register 101 will return the value CC. Thus if this value is not returned, a system error is indicated and the identification /configuration sequence halts at step 132. This step is the key step which points the microprocessor under software control to determine whether it is operating on an enhanced system. On a standard IBM MCA system this read instruction will return the value FF.

Assuming value CC is read at step 130, control transfers to step 13 which causes CCMODE POS register 100 to be read. CCMODE POS register 100 contains model specific data relating to system configuration, which in turn provides the meaning of the enhanced mode POS registers and other data required to set up the system for the machine of the present invention. This model specific identification data from CCMODE POS register 100 is compared to a table stored in system ROM to access the model specific configuration data. Next, step 136 causes the processor 20 to complete the CCMODE POS configuration sequence. Thereafter, setup mode is disabled, CCMODE* is disabled and POS initialization is completed at steps 138 and 140. After initialization in CCMODE*, the system reverts to IBM mode, thus restricting access to the enhanced CCMODE* POS features to those times when the system is in setup mode and the CC signal is active as a write to CCMODE* POS register 100.

Turning now to the remaining figures, the circuitry for implementing the system setup logic control and for providing access to the enhanced features will be described.

Figure 3:
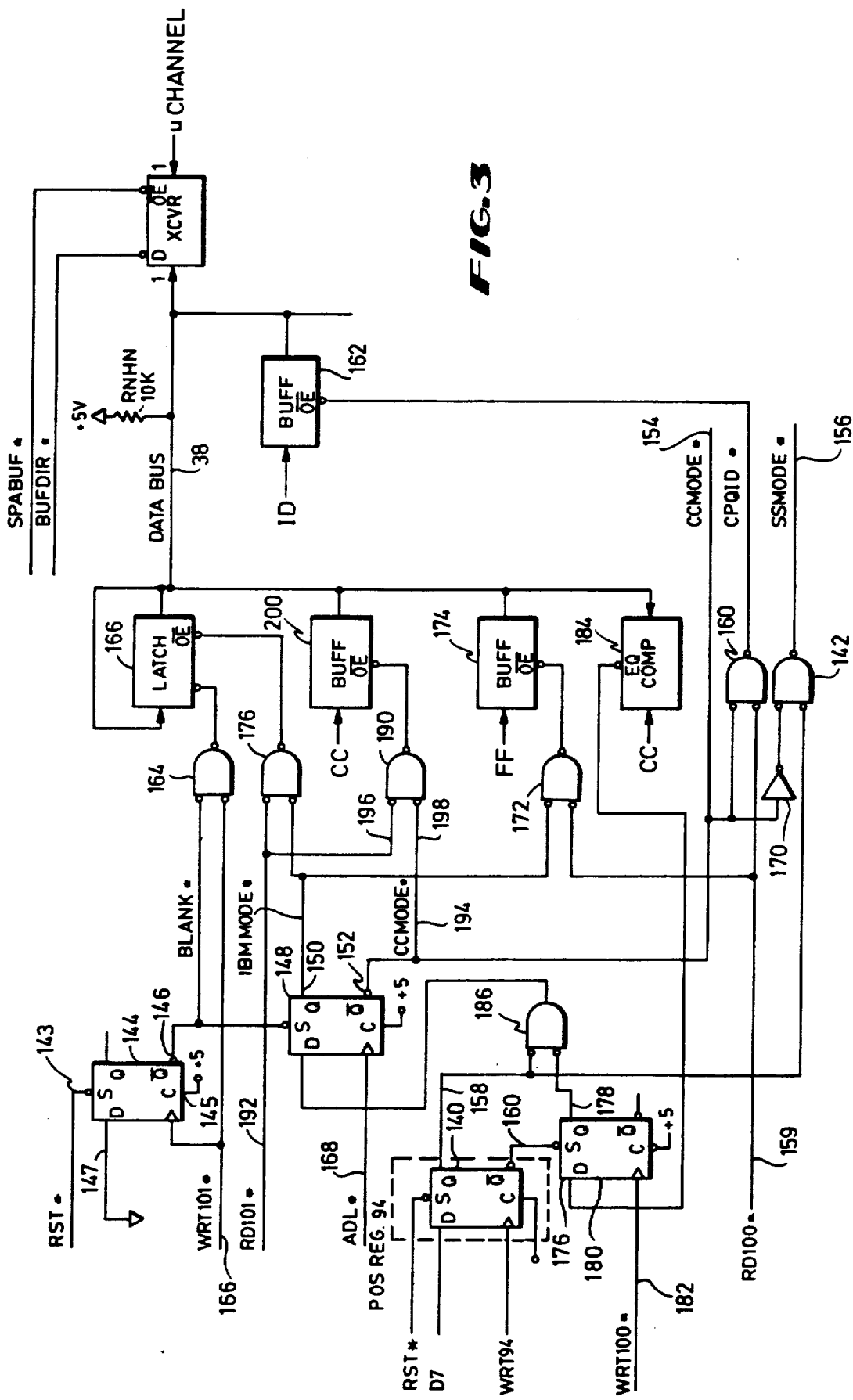

While in the preferred embodiment it is desirable to initialize both IBM compatible POS register 100 and 101, at present IBM standard MCA POS systems utilize only register 101 to contain system configuration data and fix the contents of register 100 at hexidecimal value FF. Therefore, to fully emulate present IBM MCA POS machines it is only necessary to require the initialization of POS register 101 and provide a fixed value of hexadecimal FF to register 100. In this embodiment, at step 110 in the sequence shown in FIG. 2 it would not be necessary to write the POS register 100 before proceeding. The preferred embodiment of the present invention requires initialization of both POS registers 100 and 101 to anticipate changes in IBM format wherein register 100 may not be fixed. Referring now to FIG. 3, the embodiment wherein only POS register 101 is initialized and POS register 100 is fixed at the value FF is illustrated. In this simplified embodiment, the requirement that the system be in system board setup mode before entering enhanced mode is eliminated if the setup sequence is initiated after a system reset or power up condition. It should be noted that the preferred embodiment adds a setup restriction to CCMODE for further protection of system configuration integrity regardless of whether the setup sequence is initiated after power up, reset or otherwise.

On reset, system signal RST* being active low active and is provided to the preset input to D-type flip-flop 140. Circuit 140 has its clear input tied at a logic high level, and as a result, on RST* being active low the Q output to circuit 140 goes to a logic high level. This output is provided as an input to ORGATE 142 thereby setting system signal SSMODE* to a logic high level. In this embodiment SSMODE* is used internally in system C to signify that the system is in the IBM setup mode. Circuit 140 forms a portion (bit 7) of POS register 94. Bit 7 is active low to enable setup of the system board. Thus in FIG. 3 the D input to circuit 140 is data line 7 to POS register 94, which is clocked by the WRT94* system control signal generated by a logic circuit elsewhere in the system. Thus when system board setup is enabled, the Q output at terminal 158 is low. This output is provided as a first input to ORgate 142. The second input to ORgate 142 will be low when in IBMMODE, thereby enabling the low SSMODE* output to signify the system is in IBM setup mode.

In this embodiment, on RST* active low, variable CCMODE* is set active low. CCMODE* is a system variable used to designate enhanced or COMPAQ mode operation. On reset, RST* is active low and is provided to the preset input to D-type flip-flop 148, whereupon the inverted Q output at terminal 146 goes to a logic low level. This low signal at terminal 146 is provided to the preset input to another D-type flip-flop 148 which is then initialized so that its output 150 and inverted output 152 are at logic high and low levels respectively. The output signal level on terminal 152 is the value of CCMODE*. Signals CCMODE* and SSMODE* are provided for use by other elements of the system C in determining if the system is in enhanced mode or IBM setup mode at terminals 154 and 156, respectively. The inverted Q output (low) at flip-flop 148 is also provided as an input to inverter 170 which causes a high level input signal to be provided to ORgate 142, causing the output at terminal 156 to go to a high, inactive level. Thus, in this embodiment, on reset, the system goes to CCMODE* active, SSMODE* inactive.

Following the setup enabling signal to circuit 140, a read POS register 100 signal is provided to input line 159. This signal is active low as signified by RD100* in FIG. 3, and is provided as a first input signal to ORgate 160. The second input to ORgate 160 is the CCMODE* output from flip-flop 148 which is at its active low state. Thus, the RDl00* signal causes the output of ORgate 160 to go to an active low level. This output is designated CPQID* and is provided as an output enabling signal to buffer 162. This enabling signal causes Compaq model specific data stored in system memory or hardwired latches to be output to data bus 38. This data is utilized to obtain from system memory the target IBM machine configuration data, which will be written to IBM POS register 101.

Following the RDl00* step, system ROM POS sequence provides a write to POS register 101, by providing an active low level WRl01* signal on the control bus which is present at line 166. At this point, both the preset input 143 and clear input 145 of flip-flop 144 are at logic high levels and the D input 147 is fixed low. Output 146 of circuit 144 is at a logic low level after reset. Output 146 and the active low WRl01* signal on line 166 are provided as inputs to ORgate 164. Thus the active low WRl01* signal causes the output of ORGATE 164 to go to a low level. The output of ORGATE 164 is provided as the gating signal to latch 166. The trailing, rising edge of the WRl01* signal causes the output of ORgate 164 to transition from a low to a high level to date latch 166 and complete the write to register 101 sequence.

In MCA systems, an ADL* signal goes active low to indicate address or status bits are valid on the system bus. After the WRTl0l* signal, the next instruction fetch on the bus will generate an ADL* signal on the bus which is presented to line 168. The rising, trailing edge of ADL* signal at line 168 clocks flip-flop 148 which causes the Q and inverted Q outputs 150, 152 to go to low, high logic levels, respectively, and the system is taken out of CCMODE and enters IBMMODE. In this state, the voltage level at output 152 of flip-flop 148 is at a logic high level. This voltage is provided as an input to inverter 170, and the inverted output, a low level signal, is provided as a first input to ORgate 142. If the system board setup mode is still active, the voltage level on terminal 158 of flip-flop 140 will still be low, and this voltage is provided as a second, enabling output to ORgate 142, thereby setting the output voltage SSMODE* to its active low state. At this point, the system is in IBM setup mode, and the remaining standard IBM MCA POS setup for the system board, i.e. the initialization of the remaining IBM compatible system board POS registers 102 through 107 can be completed.

While in IBMMODE, if read POS register 100 is executed, RDl00* goes active low, and together with the low level IBMMODE* signal enables ORgate 172. The enabled low level output from ORgate 172 is provided as an output enabling signal to buffer 174 which transmits the value FF from hardwired logic to the data bus, thus emulating the response of a standard IBM MCA system.

If a Read POS register 101 occurs while in IBMMODE, the active low level RDl0l* signal and the active low level IBMMODE* signal enable ORgate 176, causing latch 166 to output the target IBM model specific identification data, thereby emulating a standard IBM MCA system.

Once IBM POS setup is completed, it is necessary to set up the enhanced or CCMODE mode POS registers. This sequence is initialized by a ROM initialization instruction to write the value CC to POS register 100. If the system is in setup mode, the inverted Q output of flip-flop 140 will be at a high level. This output is provided to the preset input to flip-flop 176, which has its clear input fixed to a +5 volts or logic high level. In this condition, the Q output at terminal 178 will follow the D input 180 when clocked by the trailing, rising edge of the WRTl00* signal on line 182. The voltage level of D input 180 will be dictated by the output from comparator circuit 184. Comparator 184 compares the value of data on the data bus to the value CC from hardwired logic. When the data equals CC, the output of circuit 184 goes to an active low level, and this voltage is provided to the D input 180 of flip-flop 176. Thus, a write CC to POS register 100 command clocks the low level input at terminal 180 to the Q output 178. This active low signal enables NORgate 186 causing its output to go to a logic high level. This high level signal is provided as the D input to flip-flop 148, which when clocked by the rising edge of the next ADL* signal causes the Q outputs 150, 152 to transition to high, low levels, respectively. The low level, inverted Q output at terminal 152 places the system in CCMODE. As can be seen from this logic, when a WRITE 100* signal is active, and the data on the data bus is anything other than CC, the combined action of circuits 184, 176, 186 and 148 force the system into IBMMODE.

Once the system is in CCMODE, the system verifies that the machine is an enhanced or COMPAQ machine by executing a write FF to I/O port 101. When a subsequent RD101 command is executed in CCMODE, ORgate 176 is disabled, and ORgate 190 is enabled by the active low level signals from lines 192 and 194 which are presented as inputs at terminals 196 and 198, respectively. Enabling ORgate 190 causes an output enabling signal to be provided to buffer 200 which outputs the value CC on to the data bus. If the value of data on the bus is not equal to CC, the system is either not an enhanced or COMPAQ machine or a system configuration error condition exists.

Assuming a value CC is read in response to the Read 101 command, the system is verified and initialization of the CCMODE system board POS registers 86 can be completed. The first step in this process is a ROM instruction to read CCMODE POS register 100 to obtain the model specific data for the machine or system in use.

Reading via I/O port 100 while in CCMODE enables ORgate 160 which provides an output enabling signal to buffer 162, whereupon buffer 162 causes the COMPAQ model specific configuration data to be output to the data bus. Using this data, processor 20 determines the byte definition for each of the CCMODE system board POS registers 102 through 107. As will be explained in detail below, by permitting access to these registers in CCMODE only, access to the enhanced CMOS POS memory space and addressing the additional number of adapters for setup is permitted only on enhanced machines thereby eliminating any conflict with applications software written for standard IBM MCA systems.

Turning now to FIG. 4, the details of the circuitry of an alternate preferred embodiment will be described. In this embodiment, the basic logic sequence set forth in FIG. 2 is followed, but in contrast to the first embodiment, this second embodiment will require both IBMMODE POS registers 100 and 101 to be initialized. This embodiment anticipates that in future IBM MCA POS systems register 100 may not be set to a fixed value FF and consequently in the enhanced system a specific set of identification data will have to be written to IBM POS register 100 to fully emulate the IBM system.

In FIG. 4, flip-flops 210 and 212 form a portion of IBM compatible POS register 94. On reset, RST* goes to its active low state and is presented as an input preset signal to flip-flop 210 at terminal 214. With the reset or clear input 216 fixed to a logic high level, the RST* signal preconditions the outputs 218, 220 to high and low levels respectively. The low SBSET signal at terminal 220 is the inverse of SBSET* and is provided as a first input to NAND gate 222 thereby disabling the output to a high level. SBSET* is active low and is used to signify whether the system is in system board setup mode. The output of NAND gate 222 represents the active low CCMODE* signal which is utilized to determine if the system is in CCMODE. The SBSET signal is also provided as a first input to NAND gate 224 which is therefore disabled resulting in output 226 being at a logic high level. Output 226 represents the SSMODE* signal which is active low and utilized to signify when the system is in system board setup mode. Thus, on RST*, variables CCMODE* and SSMODE* are set to inactive or logic high states (step 102, FIG. 2).

The next step executed by the ROM initialization sequence is to place the system C in system board setup mode. In IBM MCA systems this is done by placing bit 7 of POS register 094 at a logic low level, bit 5 at a logic high level (to disable video graphics adapter setup) and bit 3 of register 096 at a low level to avoid sending setup signals to the adapter setup register 096. When this step is executed, the D-input 228 to flip-flop 210 is brought to a low level. The D-input 228 is clocked at input 230 by the output of ORgate 232. ORgate 232 is enabled when the address decode to POS register 094 (Dec 94*) at line 234 and the peripheral write (PRWR*) signal at line 236 are brought to low active levels by the system board setup signal. On the rising, trailing edge of PRWR* at line 236, the output of ORgate 232 transitions from low to high clocking flip-flop 210 thereby setting outputs SBSET* and SBSET to low and high levels, respectively. SBSET* being low indicates system board setup mode.

As will be recalled, on reset, RST* went to an active low level. RST* is provided as an input to buffer 238 which provides triplicate RST* outputs as RST*1, RST*2, and RST*3. These signals are used to precondition other circuit elements in system C. Specifically, RST*1 is provided as a clear or reset input to flip-flops 240 and 242. Flip-flops 240 and 242 each have their D-inputs and preset inputs tied to a logic high value at line 243. The RST*1 signal going active low thereby preconditions Q output 242 of flip-flop 242 and Q output 246 of flip-flop 240 to a low level.

These two low level signals comprise a disabling input to AND gate 248 making its output at terminal 250 a low level signal. This signal is a low level input to the preset input of flip-flop 252. As will be recalled, on reset, RST* went active low and SBSET output 220 of flip-flop 210 was preconditioned at a low level.

The SBSET output is provided as a preset input to flip-flop 254 at terminal 256. Flip-flops 252 and 254 have their clear inputs tied to a logic high level at line 258. Thus, on reset, output 260 of flip-flop 254 is preconditioned to a low level. This signal is provided to the D-input of flip-flop 252, which as described above has its preset and clear inputs 262 and 264 at low and high levels, respectively. Thus, on reset, outputs 266 and 268 of flip-flop 252 are preconditioned to high and low levels, respectively.

As described above, after the reset signal, when the system is placed in system board setup mode, signal SBSET goes to a logic high level. The SBSET signal is provided at line 270 as a first input to NAND gate 222 and to NAND gate 224. After reset, when the system is placed in setup mode, NAND gate 222 is enabled by high level inputs on lines 266 and 270 thereby providing an active low level signal at output 272 which represents the signal CCMODE*.

In this embodiment, two different setup flag signals are used. The first is to signify enhanced mode setup and is designated CCMODE setup. The second is to signify IBM mode setup and is designated SSMODE*. After reset and the first system setup enabling signal, variable CCMODE* is set to its active low level. These signals are present on lines 272 and 266 (FIG. 4) and indicate the system is in CCMODE ready for setup (FIG. 4). Note that this nomenclature differs from the first embodiment as illustrated in FIGS. 2 and 3 but functionally is the same. At this point, NAND gate 226 is disabled by the low level signal at line 268. Thus, variables IBMMODE and SSMODE* are at low (inactive) and high (inactive) levels, respectively. In this embodiment the variable, SSMODE*, signifies IBM mode setup only. These signals are present on lines 226 and 268 (FIG 4).

Once in CCMODE setup, the ROM setup instructions require a read CCMODE POS registers 100, 101 to obtain the data representative of the target IBM system for emulation in the same manner as described above with regard to the first embodiment. A read to POS I/O port 100 while in CCMODE setup causes the data to be output from a preset latch to the data bus (FIG. 3). In the next step (step 110, FIG. 2) this IBM emulation data is written to IBM POS registers 100 and 101 (FIG. 4). The logic circuit 82 (FIG. 1) of this embodiment is configured so that IBM POS registers 100, 101 can only be written to once, after reset.

The writing to IBM POS registers 100, 101 may be executed in either order. As will be recalled, on Reset line 244 was preconditioned to a logic low level. A write to POS I/O port 100 causes a P100* signal at line 280 and peripheral write signal PRWR* at line 236 each to go to active low levels. Lines 244, 280 and 236 are thus all at low levels as the write to I/O port 100 signal is active. At this point NORgate 282 is enabled, thereby making its output 284 transition from low on reset to high during the first write to POS I/O port 100 signal. This transition clocks IBM POS latch 285 to the data on the data bus 287 which is the target machine data for POS register 100.

Likewise, the output of ORgate 286 which was at a logic high level on reset transitions to a low level when the input signals P100* and PRWR100* go to an active low level. At the rising, trailing edge of the P100* signal on line 280, ORgate 286 is enabled making its output 288 transition from a low to a high level. This low to high signal is the clock input to flip-flop 242. After reset, the clear input 290 to flip-flop 242 reverts to a high level. On clocking at line 288, since both preset and clear inputs 242 and 290 are high, the Q output 244 to flip-flop 242 is set to a high level, thereby disabling NORgate 282 forcing its output 284 low. This signal is the gating signal for IBM POS register 100 latch 285. This completes the write to IBM POS register 100 cycle. Subsequent writes to I/O port 100 are not effective to IBM POS register 100 because after reset the clear input to flip-flop 242 remains at a high level and any clocking sets output 244 to a high level since the D and preset inputs are tied to positive voltage on line 243.

The ROM command to write to IBM POS register 101 is carried out in the same fashion as described with regard to POS register 100. On reset, the Q output of flip-flop 240 is preconditioned to a low level. On the write to POS I/O port 101, P101* and PRWR* go to active low levels on lines 296 and 236, respectively, thus enabling NORgate 298. When NORgate 298 is enabled, its output 300 transitions from low to high to clock IBM POS 101 latch 302 to the data on data bus 287. On completion of the write command, the trailing, rising edge of P101* enables ORgate 303 causing its output 304 to transition from a low to a high level. The low to high signal on line 304 clocks flip-flop 240 causing its Q output on line 246 to go to a high level thereby disabling NORgate 298 and preventing subsequent writes to IBM POS register 101 latch 302.

Only upon completion of the writes to IBM POS registers 100 and 101 are the outputs of flip-flops 240 and 242 both at logic high levels. Thus, only after both registers have been initialized is AND gate 248 enabled, causing its output on line 250 and input terminal 262 to transition from a low to a high level. Once the IBM POS registers 100 and 101 have been initialized to emulate the target IBM machine, the rest of the IBM mode POS system board setup can be completed (step 116, FIG. 2). These steps are completed in the conventional means by executing write instructions to IBM POS registers 102 through 107 based upon data in system memory.

The next step is to initialize the enhanced CCMODE or COMPAQ mode system board POS registers. This sequence begins by writing the value CC to I/O port 100 while in setup mode. In this situation, the SBSET signal will be at an active high level. This signal is provided as an input to flip-flop 254. Flip-flop 254 and associated AND gate 310, NORgate 312, and NAND gate 314 form a comparator circuit which compares the data value from the data bus presented on lines 316 to the value CC or 00110011. Only when the data bits on lines 316 are equal to the value CC are gates 310 and 312 enabled. When enabled, the outputs of gates 310 and 312 go to an active high level. When both outputs of gates 310 and 312 are high, NAND gate 314 is enabled causing its output 318 to go to an active low level. Output 318 is provided as the D input to flip-flop 254.

When the initialization of IBM POS registers 100 is completed, output 320 of flip-flop 242 designated BLANK0 was set to a low level. This signal is provided as an input to ORgate 322. Therefore, once the IBM POS register 100 has been initialized, a write CC to I/O port 100 while in setup mode will disable ORgate 322 since inputs 324 and 326 which correspond to PRWR* and P100* will go to a low level during the write cycle. Disabling ORgate 322 causes its output 328 to transition from a high to a low level during the write cycle. At the end of the write cycle ORgate 322 is enabled and its output signal level 328 transitions from a low to a high level. This output signal 328 is applied as a clock input to flip-flop 254. As long as the value written to register 100 is equal to CC, the D-input to flip-flop 254 will be low and this clocking input will set inverted Q output 260 and the D-input to flip-flop 252 to a high level.

In this condition, the next instruction executed will cause the ADL* signal to clock flip-flop 252. If both IBM POS registers have been initialized the preset input 262 to flip-flop 252 will be at a high level and the clocking signal on line 332 will cause the outputs 266 and 268 of a flip-flop 252 to go to high and low levels, respectively. These conditions in the setup mode enable NAND gate 222 and set the CCMODE* signal to an active low level and the CPQMODE signal to an active high level.

On the other hand, writing any value other than CC to IO port 100 disables NAND gate 314 setting the D-input to flip-flop 254 to a high level. When flip-flop 254 is clocked in this condition, output 260 goes to a low level causing the outputs 266 and 265 of flip-flop 252 to go to low and high levels, respectively, thereby placing the mode flags SSMODE* and IBMMODE in their active low and high states, respectively, provided the system is still in setup.

As with the first embodiment, after the system C is in CCMODE/CPQMODE, it is ready for initialization of the enhanced or CCMODE POS registers. Again, as in the first embodiment, it is preferred to verify the system is an enhanced or COMPAQ machine by executing a write value FF to POS I/O port 101 (step 126, FIG. 2). Since in CCMODE this register is read only and fixed at the value CC, reading 101 will return the value CC on an enhanced machine.

Assuming the system check step 130 (FIG. 2) is satisfied, the next step is to read CCMODE POS model specific data from CCMODE POS register 100. This data is stored in system memory or latched in CCMODE register 100 and provides the system configuration data for the specific model of system C to enable the system board and adapters to be properly initialized via steps 136, 138 and 140 (FIG. 2).

Once in CCMODE, the system C has access, in setup, to the enhanced mode POS registers 86. These registers can be utilized to provide enhanced capabilities, including the addressability of more than eight adapter boards and access to more than the standard IBM 2K CMOS memory. In the preferred embodiment CCMODE POS register 0102 is utilized to provide access to these two features. If it is desired to provide for more than eight adapter boards, bit 6 of CCMODE POS register is set to 1 in setup. This bit is set to 0 on reset and thus access to additional adapters is only allowed if the CCMODE POS sequence is executed. Bit 6 of CCMODE POS register 0102 can be utilized to decode an additional eight adapter addresses when combined with the three bits utilized from POS register 096.

Similarly, in the preferred embodiment, bit 0 of CCMODE POS register 0102 is utilized to provide access to more than the standard 2K CMOS system RAM permitted by IBM MCA machines. If bit 0 of CCMODE POS register 0102 is set to 1, an additional number of CMOS RAM register bits can be enabled depending on the size of CMOS RAM desired in the particular system C.

Because these features can only be accessed on enhanced machines in CCMODE, they are not available, nor do they interfere with the operation or execution of application software written for IBM MCA standard machines.

In the preferred embodiment, the user is permitted access to these two enhancements if during CCMODE setup CCMODE POS register 0102 has been enabled as set forth above. Referring now to FIGS. 5 and 6, the decoding circuitry which controls access to the appropriate POS registers and the enhanced features is illustrated.

In FIG. 5, latch 350 and flip-flops 352, 354, 356 and 358 comprise CCMODE POS register 0102. POS register 0102 is connected to the peripheral data bus 58 via data input lines corresponding to bits 0-7 of register 102 which are designated DIN(N)/I in FIG. 5. Access to CCMODE POS register 102 is controlled via NORgate 360 which is only enabled upon each of its three input signals being at an active low level. These inputs 362, 364 and 366 are only all at low levels when the system is in CCMODE* (line 272, FIG. 4) and a Peripheral Write or PRWR*/I (line 236, FIG. 4) to register 0102 (P 102*, line 364) is occurring.

As can be seen in FIG. 5, CCMODE POS register 102, as well as the remaining CCMODE POS registers, can be used to setup or enable various enhanced features. For example, in the embodiment illustrated in FIG. 5, bits 1, 2 and 3 are utilized to specify specific model configuration via D-input lines 368, 370 and 372 which can be decoded at outputs 374, 376 and 378. Data bit 5, input on line 380 and decoded on line 382 is utilized to designate whether channel check signals used in IBM MCA format systems will be visible (set to 1) or not visible (set to 0). A combination of signals at outputs 378, 384 and 386 connected as inputs to AND gate 388 can be used to control the manner in which the Cache memory feature is utilized.

The output signal 390 of flip-flop 352 is used to control the speed control feature which determines whether the system timer is visible (bit 7 = .1) or not visible (bit 7 = 0) to the user. On reset, RST3* (FIG. 4) goes to an active low level, and the value (zero or 1) of bit 7 presented at D-input line 392 is latched to output 390 by the transition from low to high of the output from NORgate 360 which occurs in CCMODE setup.

Access to the enhanced feature which permits addressing and setup of additional system adapters is controlled via bit 6 of register 0102. In the preferred embodiment, in CCMODE setup bit 6 is set to zero to disable this feature. Bit 6 is also set to zero as a default condition. Bit 6 is set to 1 to enable setup of an additional eight adapters. Addressing an additional eight adapters is accomplished by decoding the three bits from POS register 096 described above plus decoding bit 6 of CCMODE POS register 0102 thereby providing a four-bit address code permitting addressing of sixteen adapters.

On reset, RST3* goes to a logic low level. This signal is presented as the clear or reset input to flip-flop 354 on line 354 to reset the circuit to low and high output levels at lines 400 and 402, respectively. The default condition is thus CPQSS* high or inactive. The CPQSS* signal indicates whether the additional adapters are accessible. The RST3* signal reverts to a high level. Inputs 396 and 398 are thereafter both at logic high levels. Thereafter, if DIN(6) at line 404 is set to one indicating access to additional adapter addresses is required, the rising edge of the output signal from NORgate 360 clocks flip-flop 354 so that its Q and inverted Q outputs 400, 402 go to high and low levels, respectively, thereby setting the CPQSS* output at line 402 to its active low state.

Access to the additional system CMOS memory is controlled by decoding bit zero of CCMODE POS register 0102. In CCMODE setup, bit zero is set equal to zero if access is not permitted and equal to one if access to the additional memory is permitted. BIT 0 is presented at input DIN(0)/I on line 406 as the D-input to flip-flop 358. The preset and clear inputs are set to a logic high level so that the rising edge of the output from NORgate 360 clocks the Q output 408 to follow the D-input value on line 406. Thus, if bit zero is set to one, on clocking, output 408 will go to an active high level indicating access to enhanced CMOS is permitted.

Turning now to FIG. 6, the logic circuit which selects between IBMMODE or CCMODE setup for POS registers 101 and 102 is illustrated. If in CCMODE, signal CCMODE* on line 420 will be active low. A write command to POS register 101 will cause input signal 422 and output 424 to go to active low states. The active low signal at line 422 is passed through buffer 426 and provided as an input to ORgate 428. This input, together with the active low CCMODE* signal on line 420 causes output signal 430 to go to active low level enabling writing to CCMODE POS register 101. If in IBM mode setup, CCMODE* is at a high level and the output 430 of ORgate 428 will be high or inactive.

In IBM mode setup, the SSMODE* signal at line 432 will be at an active low level and this signal together with the output signal from buffer 426 will cause the output 436 from ORgate 434 to go to an active low level to enable writing to IBM POS register 101. This same procedure is followed with respect to POS register 102 decoding via input 438, buffer 440, and ORgates 442 and 444 to control access to CCMODE and IBMMODE POS registers 102 via outputs 446 and 448, respectively.

Reading CCMODE POS register 100, as required at step 108 (FIG. 2) to obtain COMPAQ model specific identification data is controlled via ORgate 445 and associated inputs 452, 454 and 420. In CCMODE, the input signal CCMODE* on line 420 will be at an active low level. In this condition, a Read POS register 100 command will cause inputs 442 and 444 to go to active low levels, whereupon the output CPQID* on line 456 and P-100* on line 458 will go to active low levels. Output CPQID* is utilized as an output enabling signal to latch 162 (FIG. 3) to cause the CCMODE model specific data to be output onto the data bus. If in IBM mode, reading POS register 100 will result in output 456 being inactive high, and output 458 and 460 being active low. Outputs 458 and 460 are used as enabling signals to IBM POS register 100 to cause the reading of the IBM target data onto the data bus.

In the manner described above, the system C of the present invention provides a means for emulating a standard IBM MCA POS system in IBM mode, and a means for providing system enhancements such as increased addressability of adapters and enhanced CMOS memory when the system is in CCMODE. The system must be properly initialized by writing emulation data to the IBM mode POS registers. Access to enhanced mode features is permitted only if the required password routine is executed by writing CC to POS register 100. If the system has been properly initialized, is in system board setup mode and is an enhanced system, access to enhanced mode POS registers is permitted whereby enhanced features can be accessed.

The foregoing disclosure and description of the invention are illustrative and explanatory thereof, and various changes in the size, shape, materials, components, circuitry, wiring connections and contacts, as well as in the details of the illustrated circuitry, construction and method of operation may be made without departing from the spirit of the invention.

We claim:

1. In a computer system of the type including a microprocessor, system read only memory, system random access memory, a plurality of peripheral devices, such as graphics controllers, diskette controllers, interrupt controllers, keyboard controllers, communications ports and the like, a system bus including data, control and addressing elements for interconnecting the various system elements, and means for individually addressing a plurality of adapter circuit boards connected to the system bus, the adapter circuit boards connected to the system bus, the adapter circuit boards being optional subsystems connected by the user to enhance system operation, wherein the system is assembled on a system board which further includes a set of registers for storing system board configuration data, which registers are initialized by the processor during system setup procedures pursuant to a set of instructions stored in system memory and executed on power on or reset to initialize the system, a means for configuring the system and initializing the configuration registers comprising:

a) a first memory means for storing data indicative of the system board configuration of a target machine to be emulated in emulation mode;

b) a second memory means for storing data indicative of the system board configuration for operation in enhanced mode;

c) a first set of system board configuration registers for storing system board configuration data for operation in emulation mode, said first set of system board configuration registers including means for individually addressing a first number of adapter circuit boards;

d) a second set of system board configuration registers for storing system board configuration data for operation in enhanced mode, said second set of system board configuration registers including means for enlarging the number of individually addressable adapter circuit boards;

e) means for automatically initializing said first set of system board configuration registers to emulate the target machine; and f) means for initializing said second set of system board configuration registers in response to a prescribed password procedure.

2. The system of claim 1 wherein said configuration means further includes means for limiting access to said second set of system board configuration registers to those instances where the password procedure is executed.

3. The system of claim 1 wherein aid configuration means further comprises:

a control logic circuit for requiring initialization of aid first set of system board configuration registers before the system is operational, and for limiting access to said second set of system board configuration registers to those instances where the system first executes a control password procedure.

4. The system of claim 1 wherein first memory means comprises a memory circuit preconditioned to contain data indicative of the system board configuration of the target machine.

5. The system of claim 1 wherein said first memory means comprises an addressable memory location in system read only memory.

6. The system of claims 4 or 5, wherein said means for automatically initializing said first set of system board configuration registers includes:

means for reading target machine configuration data from said first memory means; and means for writing target machine configuration data to said first set of system board configuration registers.

7. The system of claim 6, wherein said writing means comprises a write once only circuit responsive to system write commands only one time after system initialization following power on or system reset.

8. The system of claim 7, wherein said write once only circuit comprises:

a D-type flip-flop circuit having its D-input fixed at a logic low level, its clear input fixed at a logic high level, its preset input connected to an active low level system reset signal, its clock input connected to an active low level system write enable signal specific to said first set of system board configuration registers and its inverted output connected as a first input to an ORgate;

said ORgate having its second input connected to the active low level system write enable signal, and its output provided as a write enabling input to said means for writing to said first set of system board configuration registers.

9. The system of claim 1 wherein said second memory means comprises a memory circuit preconditioned to contain data indicative of the system board configuration for operation in enhanced mode.

10. The system of claim 1, wherein said second memory means comprises an addressable memory location in system read only memory.

11. The system of claim 2, wherein said means for limiting access to said second set of system board configuration registers comprises:

a comparator circuit having a first input terminal and a second input terminal, and an output terminal, said comparator including means for comparing the values of signals presented on said first and second inputs and for providing a first type of output signal when said input signals are not equal and a second type of output signal when said input signals are equal;

means for providing a prescribed password signal to said first input of said comparator;

said second input being connected to the system data bus to receive as an input signal the data present on the system bus;

wherein said output signal from said comparator is provided as an enabling signal to a mode latch circuit, said mode latch circuit being configured to provide a first and a second output signal in response to said first and second comparator output signals, respectively; and wherein said first output signal from said mode latch is provided as enabling signal to said first set of system board configuration registers, and said second output signal from said mode latch is provided as an enabling signal to said second set of system board configuration registers.

12. The system of claim 1 wherein said system includes a non-volatile memory circuit accessible during system setup procedures for use in configuring the system, wherein said first set of system board configuration registers includes means for addressing a portion of said non-volatile memory and wherein said second set of system board configuration registers includes means for enlarging the size of system non-volatile memory which is addressable during system setup procedures.

13. In a computer system of the type including a microprocessor, system read only memory, system random access memory, a plurality of peripheral devices, such as graphics controllers, diskette controllers, interrupt controllers, keyboard controllers, communications ports and the like, a system bus including data, control and addressing elements for interconnecting the various system elements, and means for individually addressing a plurality of adapter circuit board, said adapter circuit boards being provided as subsystems to enhance the system operation, wherein the system is assembled on a system board which further includes a set of registers for storing system board configuration data, which registers ar initialized by the processor during system setup procedures pursuant to a set of instruction stored in system memory and executed on power on or reset to initialize the system, a method for configuring the system and initializing the configuration registers comprising:
  a) providing a first memory means for storing data indicative of the system board configuration of a target machine to be emulated in emulation mode;
  b) providing a second memory means for storing data indicative of the system board configuration for operation in enhanced mode;
  c) providing a first set of system board configuration registers for storing system board configuration data for operation in emulation mode;
  d) providing a second set of system board configuration registers for storing system board configuration data for operation in enhanced mode;
  e) automatically initializing said first set of system board configuration registers to emulate the target machine by reading said stored target machine data from said first memory means and subsequently writing said target machine data to said first set of system board configuration registers to enable the system to individually address a first number of adapter circuit boards;
  f) initializing said second set of system board configuration registers in response to a prescribed password procedure by reading the enhanced mode data from said second memory means and subsequently writing said enhanced mode data to said second set of system board configuration registers, and setting a data value stored in said second set of system board configuration registers to enable the system to individually address an increased number of adapter circuit boards when the system is operating in enhanced mode.

14. The method of claim 13 further including the step of requiring said first set of system board configuration registers to be initialized before the system is operational.

15. The method of claim 13 wherein said step of automatically initializing said first set of system board configuration registers further includes the step of disabling the system from writing to said first set of system board configuration registers in subsequent system setup procedures not resulting from system initialization executed on power on or reset.

16. The method of claim 13 wherein said step of initializing said second set of system board configuration registers in response to a prescribed password procedure includes the steps of:
  a) providing a prescribed password data value to be stored in system memory;
  b) comparing a data value present on the system data bus during system setup procedures to said password data value;
  c) enabling the initialization of said second set of system board configuration registers only if the presented data value is equal to the prescribed data value.

17. The method of claim 13, wherein said system includes a non-volatile memory circuit, a portion of which is addressable during system setup procedures for use in configuring the system in emulation mode and wherein said step of initializing said second set of system board configuration registers further includes the step of:
  setting a data value stored in said second set of system board configuration registers to enable the system to address an enlarged portion of said non-volatile memory when the system is operating in enhanced mode.

* * * * *

UNITED STATES PATENT AND TRADEMARK OFFICE
CERTIFICATE OF CORRECTION

PATENT NO. : 5,138,706
DATED : August 11, 1992
INVENTOR(S) : Maria L. Melo and Karl N. Walker It is certified that error appears in the above-identified patent and that said Letters Patent is hereby corrected as shown below:

In Col. 17, Line 49, please replace "aid" with --said--.
In Col. 17, Line 52, please replace "aid" with --said--.
In Col. 19, Line 12, please replace "ar" with --are--.

Signed and Sealed this

Twenty-fourth Day of August, 1993

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,138,706
DATED : August 11, 1992
INVENTOR(S) : Maria L. Melo et al.

It is certified that error appears in the above-identified patent and that said Letters Patent is hereby corrected as shown below:

Column 2,
Line 41, the sentence starting "The following chart" should start a new paragraph.

Column 17,
Lines 8 and 9, delete "connected to the system bus, the adapter circuit boards".

Column 19,
Line 7, delete "board," and insert therefor -- boards, --.
Line 13, delete "instruction" and insert therefor -- instructions --.

Signed and Sealed this

Twenty-fifth Day of October, 2005

JON W. DUDAS
*Director of the United States Patent and Trademark Office*